United States Patent Office 3,345,721
Patented Oct. 10, 1967

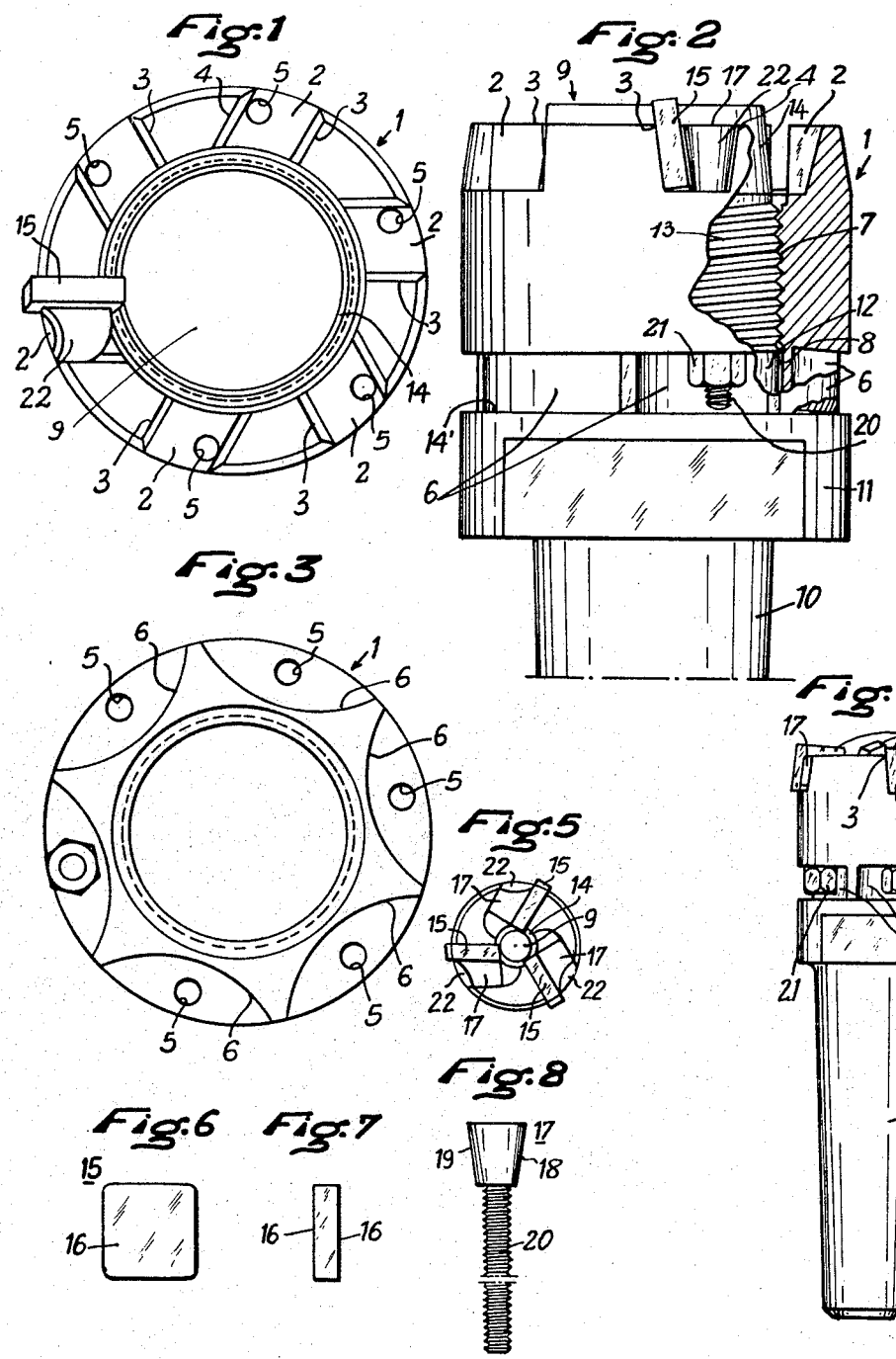

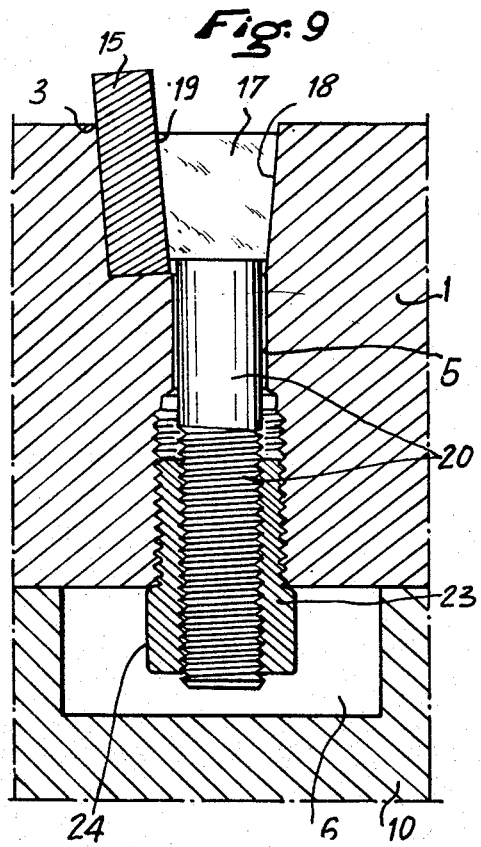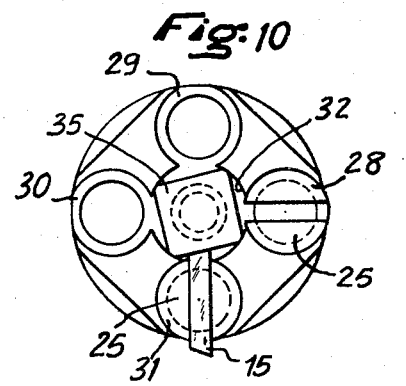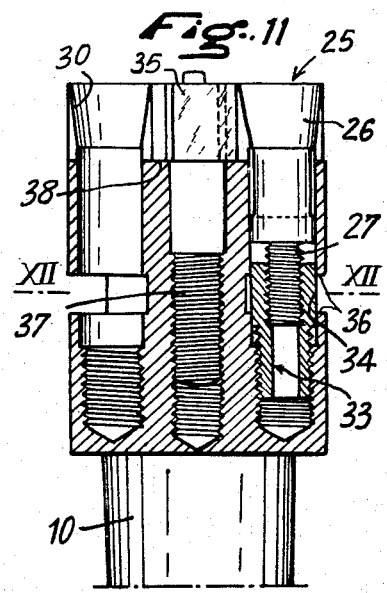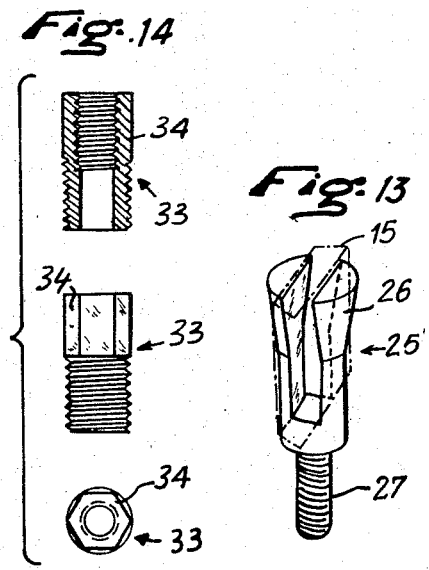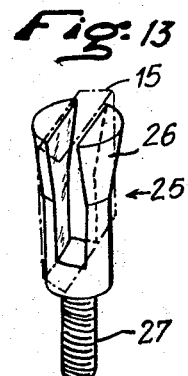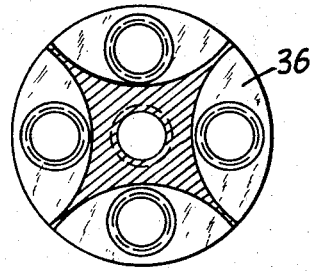

3,345,721
CUTTING BLADE MOUNTING HEADS
Henri Garih, 35–37 Blvd. Exelmans, Paris, France
Filed Feb. 16, 1965, Ser. No. 433,018
Claims priority, application France, Feb. 21, 1964,
964,589, Patent 1,416,351; Oct. 23, 1964, 992,420,
Patent 86,666
4 Claims. (Cl. 29—105)

ABSTRACT OF THE DISCLOSURE

A rotary cutter head comprises an annular member having a plurality of pockets spaced about its periphery and cutter bits detachably fixedly secured in the pockets. The cutter bits bear on their radially inner edges against a central support member, the central support member and the annular member having a screw-threaded connection between them that is coaxial with the annular member. As a result, the total diameter of the cutter head can be desirably reduced.

This invention relates to cutting blade mounting heads of the type in which detachable and indexable cutting blades or tips, to be discarded, are used as tools.

The main objects of the invention are to provide a cutting head of this kind in which the position of three surfaces of each blade, known as reference surfaces, is defined with a high degree of accuracy, and in which the system by which these blades are gripped is efficient and occupies only moderate space.

The cutting heads forming the subject of the invention may comprise:

(a) A cylindrical annular support of which the extreme bottom part is provided with openings such as notches or slots, by which the corresponding extremity of the support is subdivided as if by crenellations and which open out into its internal cavity, each opening being accurately machined in order to accommodate a cutting blade;
(b) A securing device comprising a shank for affixing the cutting head to the milling machine, this shank being coaxial and integral with the annular support;
(c) A central part or supporting core for the machining blades, this core being situated in the cavity of the annular support;
(d) Accurately machined housings for the cutting blades, these housings being situated in the openings of said annular support and comprising at least one lateral surface and one lower surface to support the said blades;
(e) Detachable cutting blades of a substantially prismatic shape, each resting on at least the two surfaces of each accurately machined housing and the core;
(f) Wedges by which the blades are secured in position in their housings.

In one alternative version, the mounting piece is provided with a screw threading which screws into a tapping in the annular support, and its front part forms the supporting core for the machining blades.

In another alternative version, the said supporting core is a cylindrical, conical or prismatic or even spherical element, which is fixed, e.g. screwed, into a tapping of the annular support.

This core accurately supports the cutting blades at a point, along a line or over a surface.

In one or another of these alternative versions, the housings of the blades are of two different kinds:

Either the base of each opening of the annular support and one lateral face serve as a housing and a support for the corresponding cutting blade, the second lateral face forming, with the first, a dihedron of which the residual space accommodates one of the aforementioned wedges.

Or alternatively, the opening has a partially conical shape, preferably with an axis parallel to that of the cutter, a conical wedge being placed therein and being subdivided by the housing intended for the blade.

Furthermore, each of the aforementioned wedges is prolonged in the form of a screw-threaded bar positioned in a bore of the cutter and equipped with a nut which bears on the body of the cutter, this system enabling the wedge to be clamped in its opening, aforementioned, and enabling the cutting blade in question to be secured in a certain definite position.

Other characteristics and advantages of the invention will be seen from the description given below by way of nonlimitative example, with reference to the accompanying drawing, in which:

FIGURE 1 is a plan view of one form of construction of the milling cutter according to the invention;
FIGURE 2 is a view in profile corresponding to FIGURE 1;
FIGURE 3 is a view from below of the tip support of the same form of construction;
FIGURE 4 is a view in profile of an alternative embodiment;
FIGURE 5 is a plan view corresponding to FIGURE 4;
FIGURES 6 and 7 are respectively front and profile views of a tip;
FIGURE 8 is a profile view of a clamping member;
FIGURE 9 is a section, through the axis of the bar, of a securing wedge for the blades, according to one alternative version;
FIGURES 10, 11 and 12 represent, respectively, a view from the top, an axial section, and a transverse section, through the plane XII—XII, of an alternative version of the cutter, made in one single piece, but with a movable stop or central core;
FIGURE 13 is a view, in perspective, of an alternative version of the wedge or clamp for the blades;
FIGURE 14 is an axial section, an elevation, and a plan view, of a securing element for the clamps shown in FIGURE 11.

Referring to FIGURES 1 to 3, the milling cutter in the embodiment illustrated has a support 1 in the form of a cylindrical head or crown. In one of the plane faces of the support there are provided openings in the form of slots or recesses 2 in the general form of prisms open on the top face, and regularly distributed around the axis of the head.

As the case may be, the edges of the prisms are either perpendicular to the axis of the support 1 or slightly oblique in relation to that axis, in one direction or the other. One outer edge 3 of each slot 2 is substantially radial and the other outer edge 4 is parallel to the edge 3. The side faces of each slot 2 are inclined in relation to one another, so that the slots 2 are widened out towards their openings.

The support 1 is traversed by holes 5 which are regularly distributed and the axes of which are substantially parallel to the axis of revolution of the support 1. Each leads at one end to the bottom of a slot 2 and at the other end to a cavity 6, formed by a portion of a cylinder the generatrices of which are parallel to the axis of revolution of the support 1. The cavities 6 are identical and regularly distributed; their number is equal to the number of slots 2.

The annular support or cutter head 1 is partially tapped at 7 along its axis, and bored at 8 at the opposite end to the slotted face.

The annular support 1 is mounted detachably as a rim on a mounting part or core 9 which comprises in succession a portion 10 intended for the fixing of the milling cutter on the milling machine, a widened portion 11 of generally cylindrical form, a cylindrical portion 12 of reduced diameter, a threaded portion 13, and a conical portion 14. These different portions are coaxial. The support 1 is screwed by its tapping 7 on the threaded portion 13 of the part 9, and its perfect centering in relation to said part is effected by the contact of the bore 8 on the cylindrical portion 12 and of the bottom face of the support on the shoulder 14' formed at the junction of the portions 11 and 12 of the part 9, these contacting surfaces being accurately machined and if necessary ground.

In FIGURES 4 and 5, a modified embodiment has been illustrated which differs from the embodiment described above only in the number of slots 2, which is reduced to three, and in the corresponding number of cutter blades or tips. The description above is consequently applicable to this embodiment and therefore will not be repeated.

In the slots 2 there are disposed prismatic blades or teeth 15, particularly of a parallelepipedic shape, the larger faces 16 of which are generally square. One of the faces 16 of each blade 15 is disposed in a slot 2 and applied against the inclined side of the latter corresponding to the edge 3. In the slot 2 there is also disposed a fastening element 17 having two inclined faces 18 and 19 forming a wedge at the corner of the slot, and a threaded rod 20 which passes through one of the holes 5. On the free end 20 a nut 21 is screwed. Each blade 15 projects by one of its narrow faces into the bore of the annular support 1, and one edge of that face is applied against a generatrix of the conical portion 14 of the mounting part 9. The blade is therefore supported by two of its neighbouring faces on the bottom and on the side of the slot, and by the third secant face on the body 14. These three supports are machined, as well as the tip, with all the accuracy necessary to ensure that the two working edges of the tip will be in the precise position desired. The surface 14 being truncated conical, the tip is inclined as required in relation to the surface to be milled, at angles which are perfectly defined by the design. The clamping of the nut 21 effects the powerful locking of the tip in the required position through the wedge-shaped portion 18, 19 of the member 17. When untightened, the nut 2 bears against the shoulder 14' of the part 9 and withdraws the fastening member 17 from the slot 2.

When the portion 14 is larger than the screw threads, this part is naturally composed of a separate piece screwed on the mounting part after the support 1 has been screwed on to said mounting part.

When each slot 2 is equipped with a blade 15, it is sufficient for the portion 10 of the part 9 then to be placed in the chuck of the milling machine, and the milling cutter thus constituted is ready to work. The portion 10 is for example of the Morse cone type.

It will be observed that each fastening member 17 preferably has a truncated conical cavity 22, which is intended for the removal of cuttings taken off by the corresponding tip.

The clamping device composed of the fastening member 17 and the nut 21 is particularly simple, effective, and small in size, and makes it possible to construct particularly compact milling cutters.

The machining of the slots 2 is particularly easy and is effected by means of a double-cut truncated conical milling cutter displaced parallel to the radius of the annular support 1 and discharging into the internal cavity of the support. It is seen immediately that it is sufficient to change the milling cutter and its mounting in order to vary the inclination of the three sides of the slots 2.

In a general way, the machining of the components of a milling cutter according to the invention entails only simple and few operations. Thus the mounting part 9 is a part machined on a lathe, and the annular support 1 is also turned on a lathe; the slots 2 and the cavities 6 are each simply milled by a single operation.

The wedge-type securing device for the cutting blades forms the subject of the embodiment shown in FIGURE 9. The housing 2, wedge 17 with its dihedral surfaces 18 and 19, and its threaded bar 20, the blade 15 and the recess 6 remain the same. But instead of screwing a simple nut onto the end of the bar of the wedge 20, a tube 23 externally screw-threaded and equipped with a means of rotation such as an external bolt 24 is placed in a tapping coaxial with the hole 5 and towards the recess. This tube is internally tapped to enable it to accommodate the threaded end of the bar 20. The screw-threading and the tapping of the tube have different pitches or, preferably, equal but opposite pitches. When the bolt 23 is rotated, the bar 20 being prevented from turning, the latter rises or descends in its housing, thus freeing the wedge 27 or its clamping system. In cases where the tapping and the threading take opposite directions, the operations of clamping and releasing the wedge 17 are accelerated. Furthermore, when the cutter is mounted in position, the tube 23 will not come out.

A similar device is illustrated for the cutter shown in FIGURES 10–14 and is described farther on. This cutter is a variant of that shown in FIGURES 1–5.

For this cutter, it has already been stated that the rim 1 and the mounting piece or cone 9 can be manufactured as one single part. This also applies to the cutter shown in FIGURES 10–12, but this also shows certain points of difference by comparison with the cutters to which the main patent relates.

In the first place, the blades 15 (FIGURE 5) are placed in a clamp comprising an upper part 26, at least partly frustum-shaped, forming a wedge, and with a slit corresponding to the thickness of the blade 15, subject to the usual machining clearances, and a screw-threaded bar 27. The clamp 25 is positioned in a frustum-shaped housing of the cutter (FIGURE 11), preferably with an axis parallel to that of the cutter, in one of the mounting positions of the blade 15. The cutter shown in FIGURES 10–12 has four such positions. The upper part of each housing is frustum-shaped having the same apex angle as 26 and a height slightly above that of the wedge 26, in order to enable the latter to be drawn downwards, by a very small distance. Each frustum-shaped part 28–31 of the housings terminates (FIGURE 10) on the one hand outside the cutter and on the other inside the rim, which is itself hollowed out inside the circle 32. FIGURES 10–12 show, on the right, a clamp 25 without a blade; at the bottom, a clamp 25 with a blade 15 in position; in the top lefthand corner, the other two housings, empty.

Furthermore, the method of fixing the blades 15 is a transposition of the device shown in FIGURE 9. The part 33 and its nut 34 correspond to the tubular part 23. The former is positioned in an appropriate tapping of the cutter. The nut is visible and can be manoeuvered in one of the recesses 36, analogous to the recesses 6 of the first embodiment. The tubular part 33 is located in the housing by the clamps 25.

The part 33 is internally tapped, and the bar 27 of the clamp 25 is screwed into it. The clamp is operated by rotating the nut 34. Needless to say, the internal tapping and the external threading of the tubular part 33 are preferably of opposite pitch. When the clamp 26 forming a wedge is drawn downwards, it tightens onto the blade 15 and secures it in position.

Finally, the conical surface 14 of the bearing surface or central core, described previously (FIGURES 1–5), is here replaced by the lateral surface of a central core 35, provided with a threaded bar 37 which is screwed into an appropriate axial housing of the cutter. A shoulder 38 of the bearing 35, supported on the upper surface of the cutter, enables the position of the lateral faces of the bearing 35 to be fixed after the bar 37 has been screwed all the way. Needless to say, the bearing 35 may be cylindrical, prismatic, pyramidal, conical, or even spherical. Its purpose is to provide an accurate support, at a point, along a line or over a surface (as in the case of the drawings), for the cutting blades. Its movability enables it to be replaced by cores of different dimensions, thus enabling the cutting diameter of the cutter to be varied by changing the blades or leaving them in position, as the case may be.

It is obvious that the various alternative versions mentioned above can be applied separately to any one of the cutters discussed.

Numerous modifications can be made to the aforementioned cutter, without departing from the principle of the invention, the constructional versions and alternative methods having been described and illustrated in order to enable it to be understood and as example having no limitative effect.

I claim:

1. A cutter head comprising a tool shaft which is releasably connectable to a cutting machine, an annular member coaxially screw-threaded on the tool shaft and having a plurality of pockets spaced about its periphery for the reception of cutter bits, a screw-threaded clamping member in each pocket for releasably securing a cutter bit in the pocket, the axes of the clamping members being parallel to each other and to the axis of the annular member, the clamping members extending through the annular member and having tapered heads disposed in said pockets, the side walls of the tapered heads converging in a direction toward the other end of the clamping members, said other ends of the clamping members having a nut thereon that acts against the annular member to draw said tapered head toward the bottom of its associated recess, said tool shaft having an end that is tapered in a direction opposite the direction of taper of said heads and that extends along and closes the radially inner side of said pockets and against which the radially inner portions of the cutter bits bear.

2. A cutter head as claimed in claim 1, said recesses having side walls that are oppositely inclined at acute angles to the axis of the tool shaft and that converge in the same direction as and are parallel to said converging side walls of said tapered heads.

3. A cutter head as claimed in claim 1, and cutter bits disposed in said pockets between the side walls of the pockets and said tapered heads, said bits being pyramidal and having one side in contact with a side wall of the recess and another side in contact with said tapered end of said tool shaft.

4. A cutter head as claimed in claim 1, the surface of said tool shaft against which said cutter bits bear being conical.

References Cited

UNITED STATES PATENTS

| 989,119 | 4/1911 | Clouse | 29—105.1 |
| 2,400,856 | 5/1946 | Thompson | 29—105.1 |
| 2,712,686 | 7/1955 | Heldt | 29—105 |
| 2,805,467 | 9/1957 | Greenleaf | 29—105.1 |
| 2,968,859 | 1/1961 | Garnett | 29—105 |
| 3,091,138 | 5/1963 | Berry | 29—105 X |
| 3,276,101 | 10/1966 | Plein | 29—105 |

FOREIGN PATENTS

| 1,297,194 | 5/1962 | France. |
| 554,058 | 7/1932 | Germany. |

HARRISON L. HINSON, *Primary Examiner.*